United States Patent
Brennan et al.

(10) Patent No.: US 7,249,771 B1
(45) Date of Patent: Jul. 31, 2007

(54) PORTABLE UTILITY CARRIER APPARATUS

(75) Inventors: Daniel A. Brennan, McCordsville, IN (US); Mark A. Dronen, Elmhurst, IL (US)

(73) Assignee: Go! Products, Inc., Elmhurst, IL (US)

( * ) Notice: Subject to any disclaimer, the term of this patent is extended or adjusted under 35 U.S.C. 154(b) by 153 days.

(21) Appl. No.: 10/749,641

(22) Filed: Dec. 31, 2003

(51) Int. Cl.
*B62B 3/02* (2006.01)

(52) U.S. Cl. .................. 280/35; 280/766.1; 280/769

(58) Field of Classification Search .............. 280/6.15, 280/6.151, 400, 401, 405.1, 406.1, 415.1, 280/416.3, 638, 35, 640, 656, 79.11, 769, 280/763.1, 764.1, 765.1, 766.1
See application file for complete search history.

(56) References Cited

U.S. PATENT DOCUMENTS

| | | | |
|---|---|---|---|
| 2,608,191 A | 8/1952 | Schmidt et al. | |
| 4,089,554 A | 5/1978 | Myers | |
| 4,744,590 A | 5/1988 | Chesney | |
| 4,941,797 A * | 7/1990 | Smillie, III | 414/462 |
| 5,002,293 A * | 3/1991 | Gottselig | 280/47.35 |
| 5,224,636 A | 7/1993 | Bounds | |
| 5,443,189 A | 8/1995 | Hirschfeld | |
| 5,640,949 A | 6/1997 | Smith | |
| 5,927,745 A | 7/1999 | Cunningham | |
| 6,105,843 A * | 8/2000 | Dollesin | 224/509 |
| 6,168,058 B1 | 1/2001 | Janek | |
| 6,260,752 B1 | 7/2001 | Dollesin | |
| D449,269 S | 10/2001 | Gower | |
| 6,305,705 B1 | 10/2001 | Cook | |
| 6,502,730 B2 * | 1/2003 | Johnson | 224/519 |
| 6,502,845 B1 * | 1/2003 | Van Vleet | 280/491.1 |
| 6,802,441 B1 * | 10/2004 | DuRant et al. | 224/513 |

* cited by examiner

Primary Examiner—Christopher P. Ellis
Assistant Examiner—Brian Swenson
(74) Attorney, Agent, or Firm—Bingham McHale LLP

(57) ABSTRACT

A transportable utility carrier apparatus for coupling to a transport vehicle, including an upper frame, a recessed platform connected to the upper frame, a wheeled base, a lift system interposed between the base and the upper frame for moving the wheeled base relative to the platform between a transport position and a freestanding position, a square hitch tube connected to the upper frame, and a rollered receiver hitch mountable to the transport vehicle. The wheels are spaced from the ground in the transport position. The square hitch tube is receivable within the rollered receiver hitch and the rollered receiver hitch eases insertion of the square hitch tube thereinto to prevent binding on unleveled ground.

11 Claims, 18 Drawing Sheets

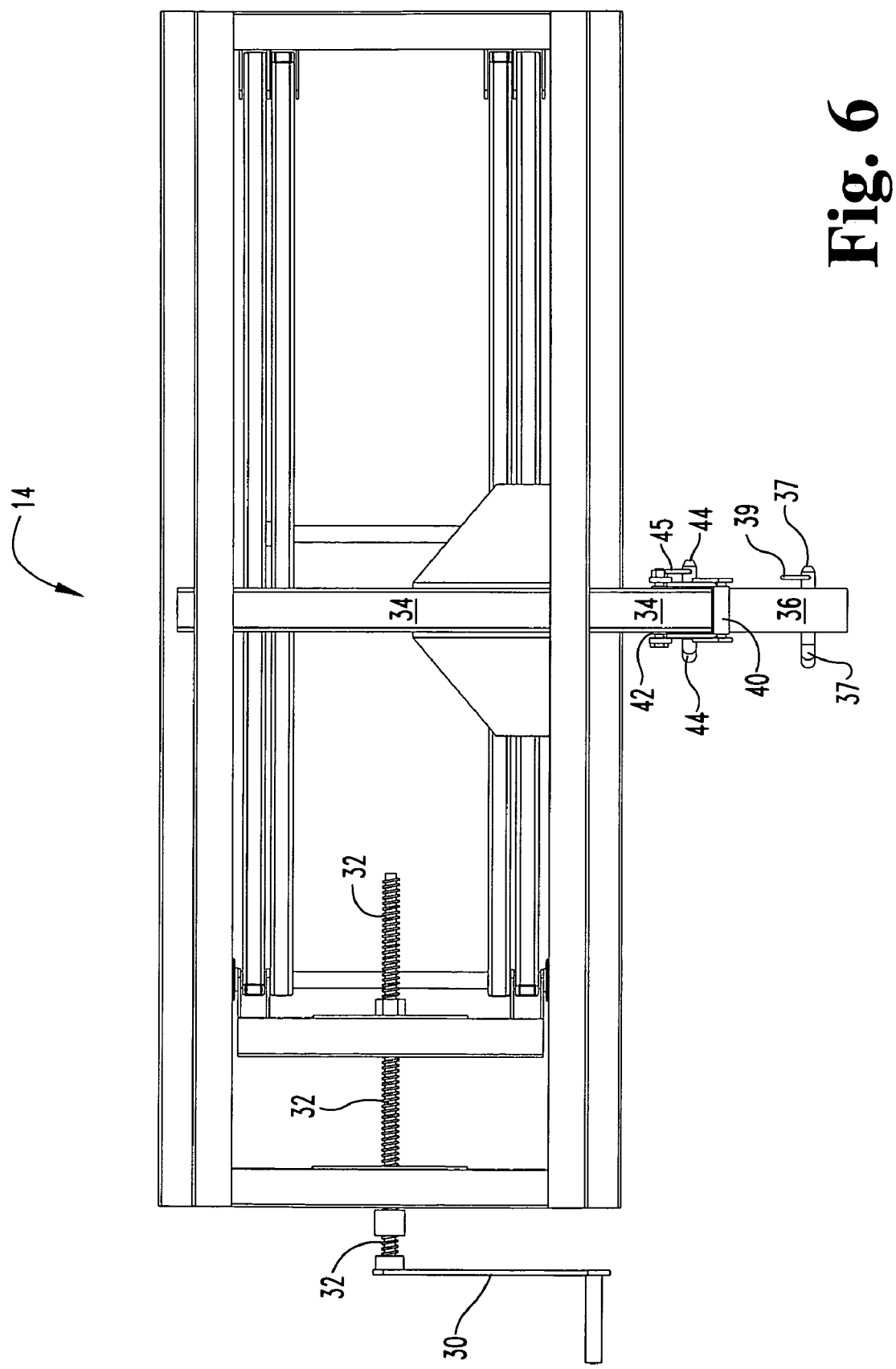

PORTABLE UTILITY CARRIER APPARATUS

REFERENCE TO RELATED APPLICATION

This application claims the benefit of co-pending U.S. patent application Ser. No. 09/976,623, filed Oct. 12, 2001 and claiming the benefit of U.S. Provisional Patent Application Ser. No. 60/240,430, filed Oct. 13, 2000, and co-pending U.S. patent application Ser. No. 10/410,900, filed Apr. 10, 2003 and claiming the benefit of U.S. Provisional Patent Application Ser. No. 60/373,062, filed Apr. 16, 2002.

BACKGROUND OF THE INVENTION

Pickup trucks and sports utility vehicles (SUVs) are designed to carry cargo, but for heavier items and containers, loading and unloading the cargo becomes problematic due to its weight and bulk. Further, while many trucks and SUVs are equipped with hitching connections, the heavy cargo cannot be directly connected to the hitch.

There is therefore a need for a cargo container system that may be transported by a hitch equipped vehicle that does not need to be lifted into the vehicle. The present invention addresses this need.

SUMMARY OF THE INVENTION

The portable utility carrier apparatus of the present invention consists of a raisable and lowerable platform that may house a variety of cargo. The platform is connected to a lift system that is used to raise and lower the platform. The apparatus is carried and transported solely via a receiver type hitch assembly one part of which is integral with the lift system and one part of which is conventionally mountable on a transport vehicle. The lift system can be used to mount the apparatus to a transport vehicle without the need to physically lift the apparatus. Extending from the lift system is an array of wheels. Thus, when detached from the transport vehicle, the apparatus can be easily moved, utilizing the wheels, again without the requirement of physical lifting. The wheels are not used in the transport of the apparatus by the transport vehicle.

One object of the present invention is to provide an improved system for transporting cargo using a hitched vehicle. Related objects and advantages of the present invention will be evident from the following descriptions.

BRIEF DESCRIPTION OF THE DRAWINGS

FIG. 6 is a top plan view of the scissors lift system of FIG. 5A.

DETAILED DESCRIPTION OF THE PREFERRED EMBODIMENTS

Figure 2:
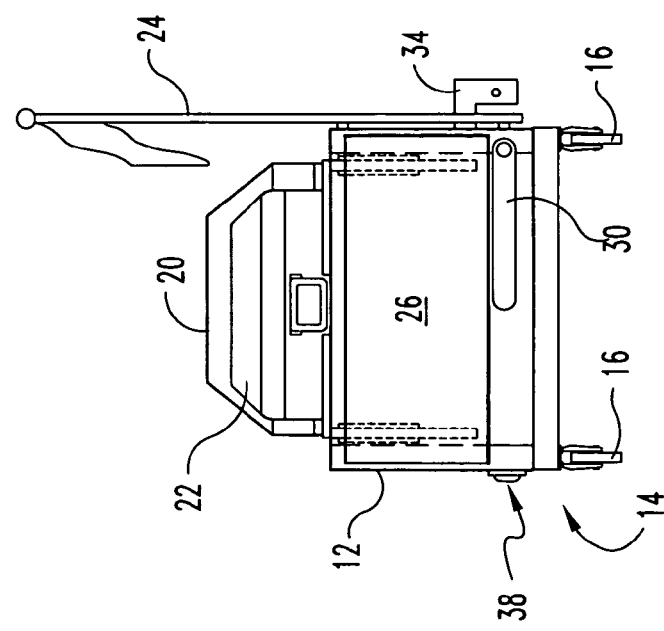
FIG. 2 is a right side view of the apparatus of FIG. 1.

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Figure 3:
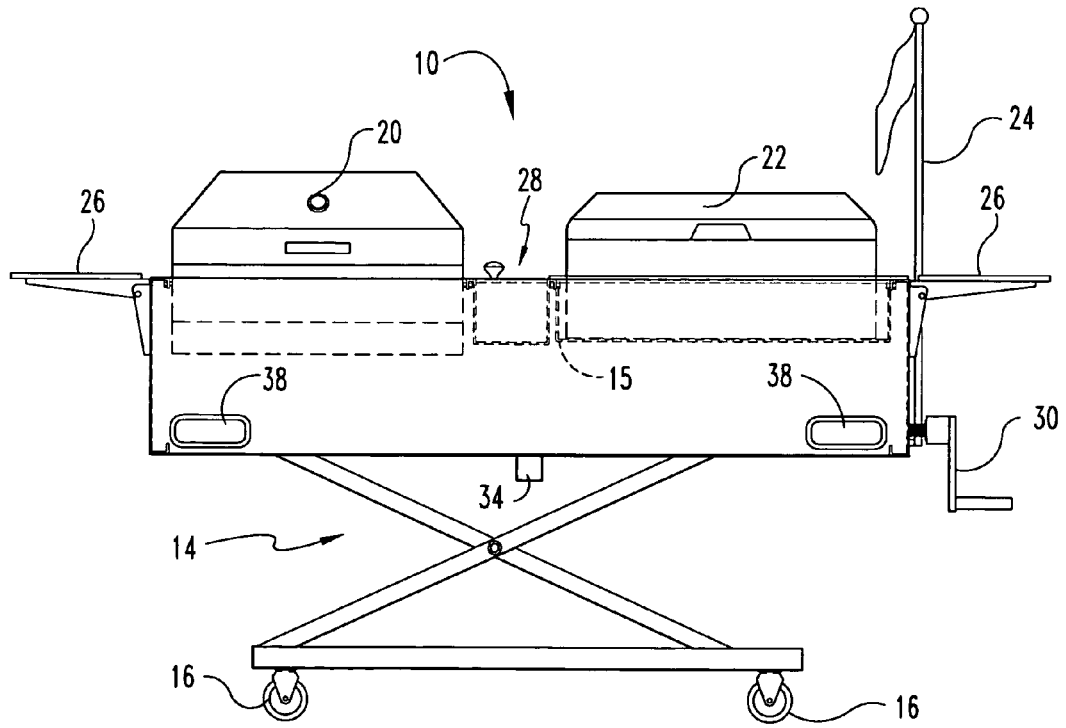
FIG. 3 is a front elevational view of the apparatus of FIG. 1 in the use position.

Turning now to the drawings, the portable grill and cooler apparatus 10 of the present invention comprises an all-in-one tailgating package, consisting of a raisable and lowerable platform 12 that houses a removable charcoal or gas grill 20 and a removable refrigerator or cooler chest 22, with a storage compartment 28 between the two, a telescoping flagpole 24 mounted to the platform 12 to display favorable team colors, and a fold down table 26 attached on both ends of the platform 12 to provide more cooking area. The platform 12 is raisable to a use position (FIG. 3) and lowerable to a transport position (FIGS. 1 and 2) in the preferred embodiment to date by a conventional manual scissors lift system 14 (FIGS. 5 and 6) that uses a hand crank 30 to turn a threaded rod 32 that is connected to the scissors arms of the scissors lift system 14 (FIGS. 5 and 6). Attached to the bottom of the scissors lift system 14 are four (4) caster wheels 16 to provide mobility to the apparatus 10 when in the use position (FIG. 3). The wheels 16 play no part in the transport of the apparatus 10 in the use position and mounted to a transport vehicle.

On the backside of the scissors lift system 14 is a 2 inch by 2 inch square hitch tube 34, which is insertable into a novel rollered receiver hitch 36 of the present invention that can be removably inserted into a conventional hitch fitting on a transport vehicle, where the hitch 36 is pinned 37 and locked 39 in place for safety. Since the platform 12 may cover a transport vehicle's taillights when the platform is in the transport position and is attached to a transport vehicle via square hitch tube 34 and rollered receiver hitch 36, two taillights 38 are mounted on the front of the platform 12, with a conventional taillight electrical plug-in being provided at the back of the platform 12 for conventional attachment to the electrical system of a transport vehicle.

Figure 5A:
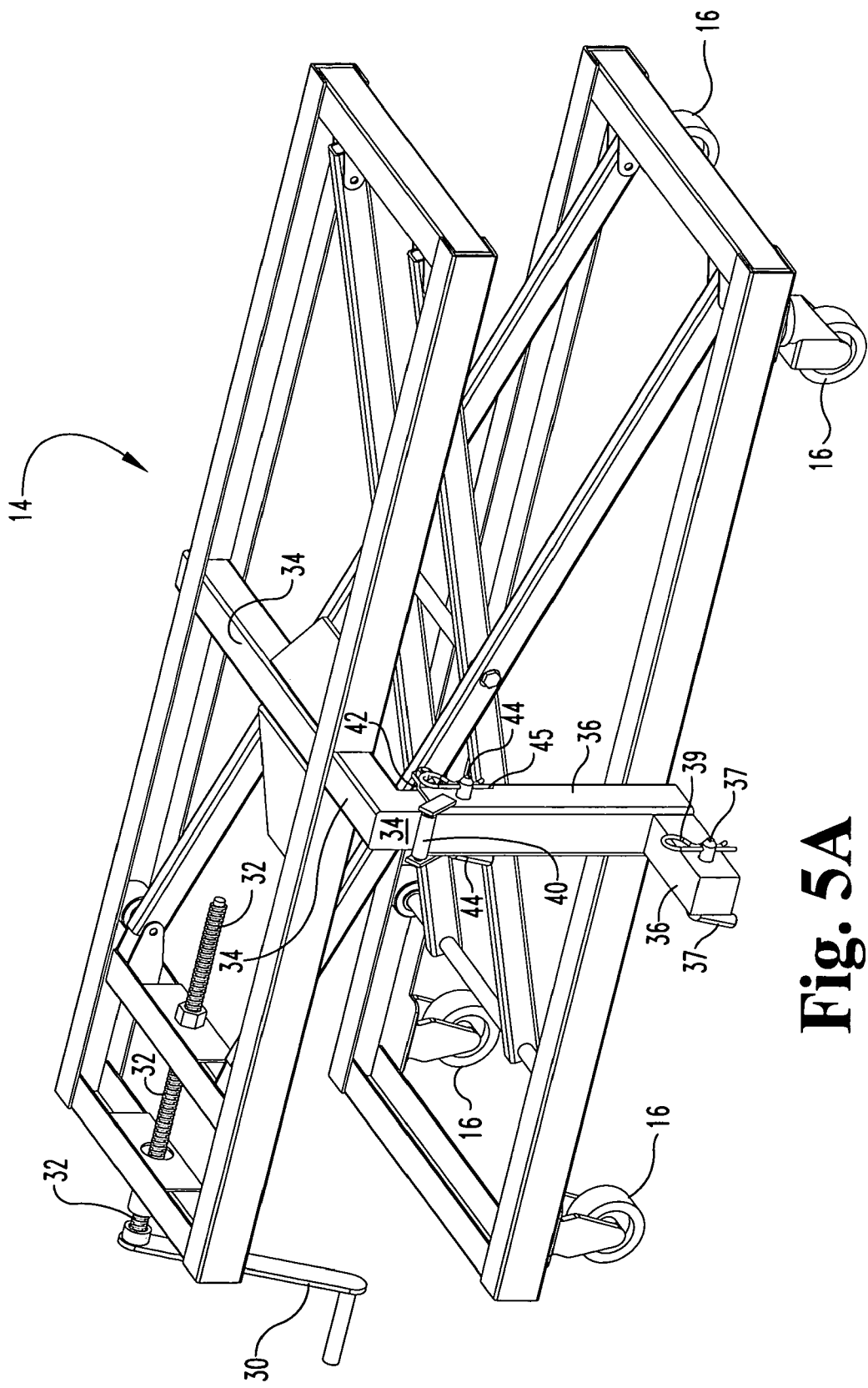
FIG. 5A is perspective view of a preferred embodiment of the scissors lift system of the present invention.
Figure 5B:
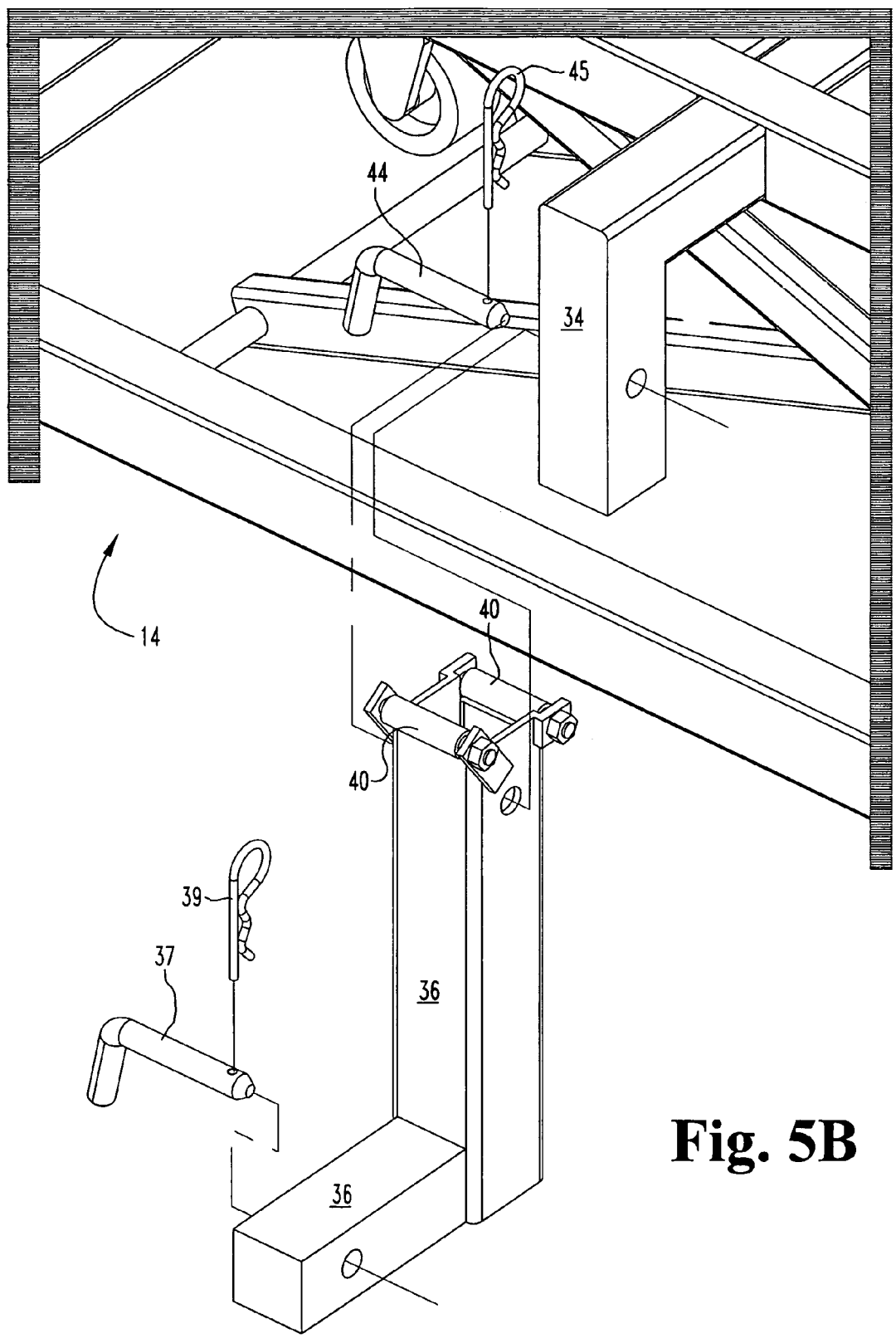
FIG. 5B is an expanded partial perspective view of the hitching mechanism of FIG. 5A.

The complete portable grill and cooler apparatus 10 is attachable and detachable to a transport vehicle by using the scissors lift system 14. The scissors lift system 14 is raised until square hitch tube 34 is above the height of the rollered receiver hitch 36 when mounted and pinned 37 and locked 39 to a transport vehicle (see FIGS. 5A-B). The apparatus 10 is then rolled on wheels 16 into place such that the square hitch tube 34 is over the rollered receiver hitch 36, and then the scissors lift system is lowered into the transport position (FIGS. 1 and 2) with the square hitch tube 34 received within rollered receiver hitch 36 (FIGS. 5A-B). Rollers 40, 42 at the top of rollered receiver hitch 36 ease the insertion of square hitch tube 34 of the scissors lift system and prevents the pieces from binding when the apparatus 10 and a transport vehicle are on unleveled ground, for example. When the scissors lift system is fully lowered into the transport position and the square hitch tube 34 has been pinned and locked in place within rollered receiver hitch 36 with conventional hitch pin 44 and lock 45 (FIGS. 5A-B), and the taillights 38 have been electrically connected to a transport vehicle's electrical system, the apparatus 10 is transportable by a transport vehicle without further ado. Again, note that the wheels 16 would not be touching the ground. Reversing theses steps would place the apparatus 10 in the use position (FIG. 3), ready for a tailgating party.

Figure 4:
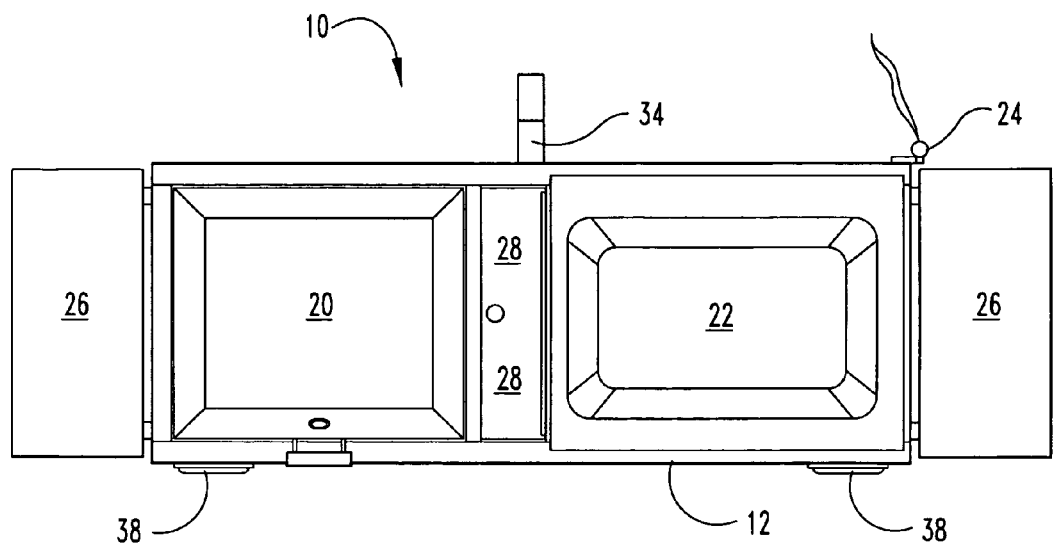
FIG. 4 is a top plan view of the apparatus of FIG. 3.

Being able to provide all of the necessary equipment to tailgate in one easily transportable and easily moveable platform 12 makes the portable grill and cooler apparatus 10 of the present invention a unique product. Everything associated with tailgating is within arms reach. In the preferred embodiment to date, both the grill 20 and the cooler chest 22 are removable from platform 12 so they can be used elsewhere. They fit within correspondingly sized openings in the top of platform 12 (FIG. 4). Grill 20 is removably bolted to platform 12 (FIG. 3) and cooler chest 22 rests upon and is held is place by metal strapping 15 that is attached to platform 12 (FIG. 3).

The flagpole 24 of the preferred embodiment telescopes out to 15 feet. The fold out tables 26 on each end increases preparation space. The box 28 is useful for storing tailgating cooking utensils. The cooler chest 22, grill 20 and storage box 28 are all lockable to prevent vandalism or theft.

Figure 1:
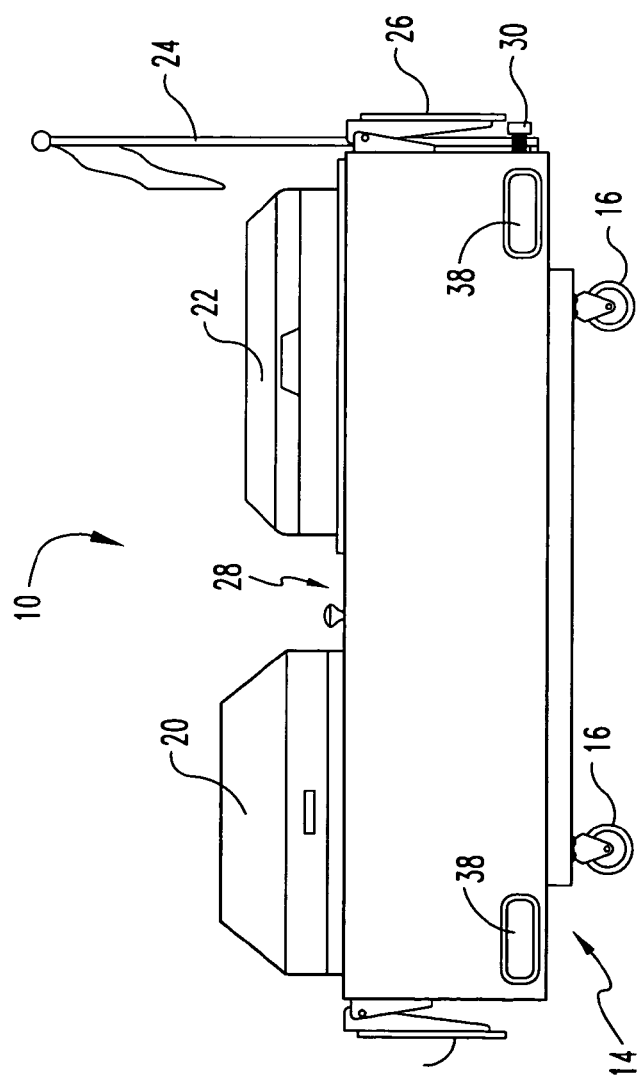
FIG. 1 is a front elevational view of a first embodiment of the apparatus of the present invention in the transport position.

The general steps that are necessary to utilize the portable grill and cooler apparatus 10 of the preferred embodiment to date of the present invention may be summarized as follows. Wheel the apparatus 10, appropriately loaded for tailgating, to a transport vehicle. Insert, pin 37 and lock 39 the rollered receiver hitch 36 within the conventional hitch assembly of the transport vehicle. Connect the taillights 38 to the electrical system of the transport vehicle. Wheel the apparatus 10 toward the transport vehicle until square hitch tube 34 is over the rollered receiver hitch 36. Crank down the scissors lift system 14 until the square tube 34 is the appropriate distance within rollered receiver hitch 36 and insert pin 44 and lock 45. Continue to crank the scissors lift system down until the caster wheels 16 are off the ground and all the way up under the platform 12 into the transport position (FIGS. 1 and 2). The apparatus 10 is ready for transportation to the tailgate party site.

For set up at tailgating destination, remove the electrical plug for taillights 38 and crank down the castor wheels 16, utilizing the scissors lift system 14 to ground level. Pull the lock 45 and pin 44 from the rollered receiver hitch 36 and raise the scissors lift systems 14 further until the square hitch tube 34 is free of the rollered receiver hitch 36 and the platform 12 is in the use position. Wheel and position the apparatus 10 on level ground. Raise the telescoping flagpole 24, and lock side tables 26 in place. The apparatus 10 is now in the grilling and chilling mode.

Reload the apparatus 10 after the tailgating event in the reverse sequence and head home in a transport mode.

In the preferred embodiment to date, the scissors lift system 14, fully illustrated in FIGS. 5 and 6, and the platform 12 have been manufactured from mild steel that has been painted with powdered coated paint to prevent rust. The steel for constructing platform 12 has been preferably 20-gauge sheet steel. The preferred plan view (FIG. 4) dimensions of platform 12 have been 64"×24"×18", with an empty weight of the apparatus 10 of about 175 pounds. In the transport position, the preferred height of the apparatus 10 has been about 22" and in the use position about 40". The grill 20 of the preferred embodiment to date has been either a 23"×17" BRINKMAN brand charcoal or gas grill Model King Swivel or propane gas grill. A propane gas grill would require a propane gas source, which to date has been a propane tank hung on a short tubular extension to the top surface of square hitch tube 34. The preferred cooler chest 22 to date has been a 50-quart COLEMAN brand cooler chest. Alternately, a miniature refrigerator 22 may be selected. The refrigerator may be powered via electrical connection to the vehicle's power source, or may be powered by a battery or generator positioned within the housing platform 12. Side tables 26 have been preferably sized at 19"×8".

While the apparatus of the invention has been described above in use with a portable grill and cooler chest, the platform 12 is adaptable for a wide range of uses, from the tailgating uses of the preferred embodiment to hauling camping gear to carrying potable water to farm animals. Many objects can be moved using the apparatus of the present invention without having to use a pull-behind trailer. It should be appreciated that the portable grilling and cooling apparatus 10 may be modified to house and carry additional items, such as a radio, stereo, audio tape player, CD player, television, video tape deck and/or DVD player, sink, trash compartment, and virtually any device or supplies that may enhance the tailgate party experience. Moreover, the housing/lift/hitch system may be further modified to carry other items than tailgating supplies, such as camping equipment, tools, medical supplies, fuel, firefighting equipment, and the like.

Figure 7:
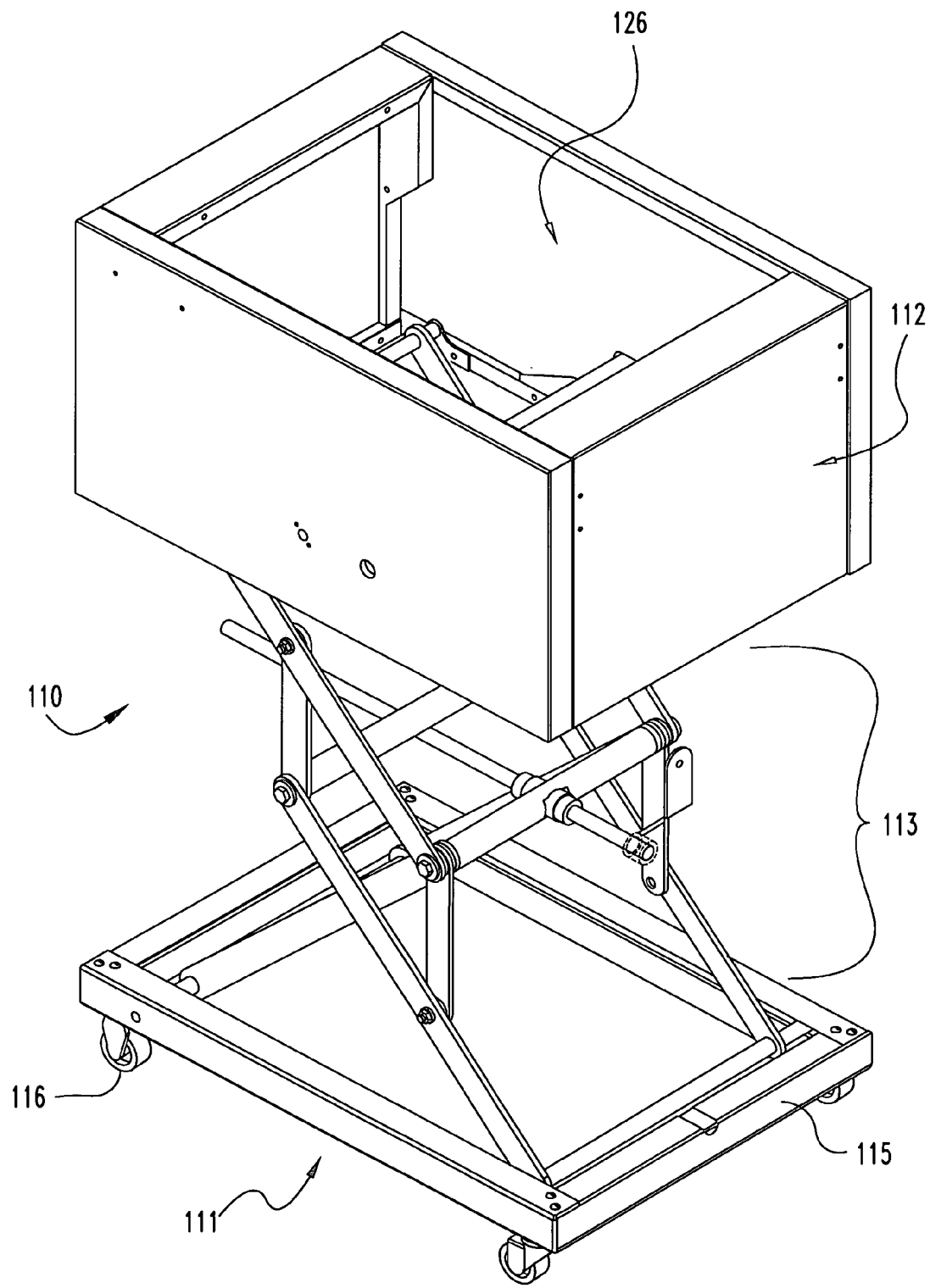
FIG. 7 is perspective view of a second embodiment of the apparatus of the present invention.
Figure 8:
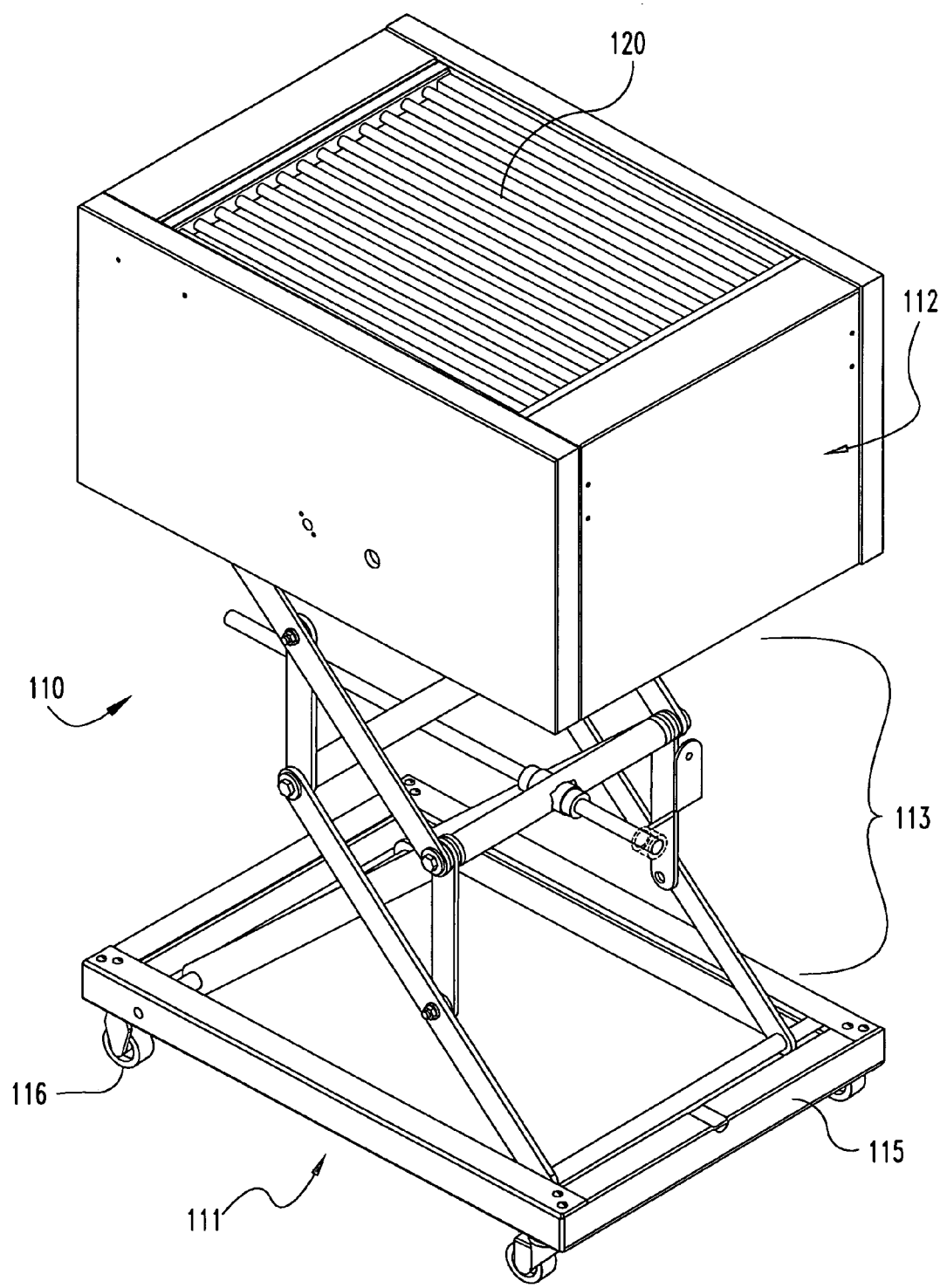
FIG. 8 is a second perspective view of a second embodiment of the apparatus of the present invention.
Figure 9A:
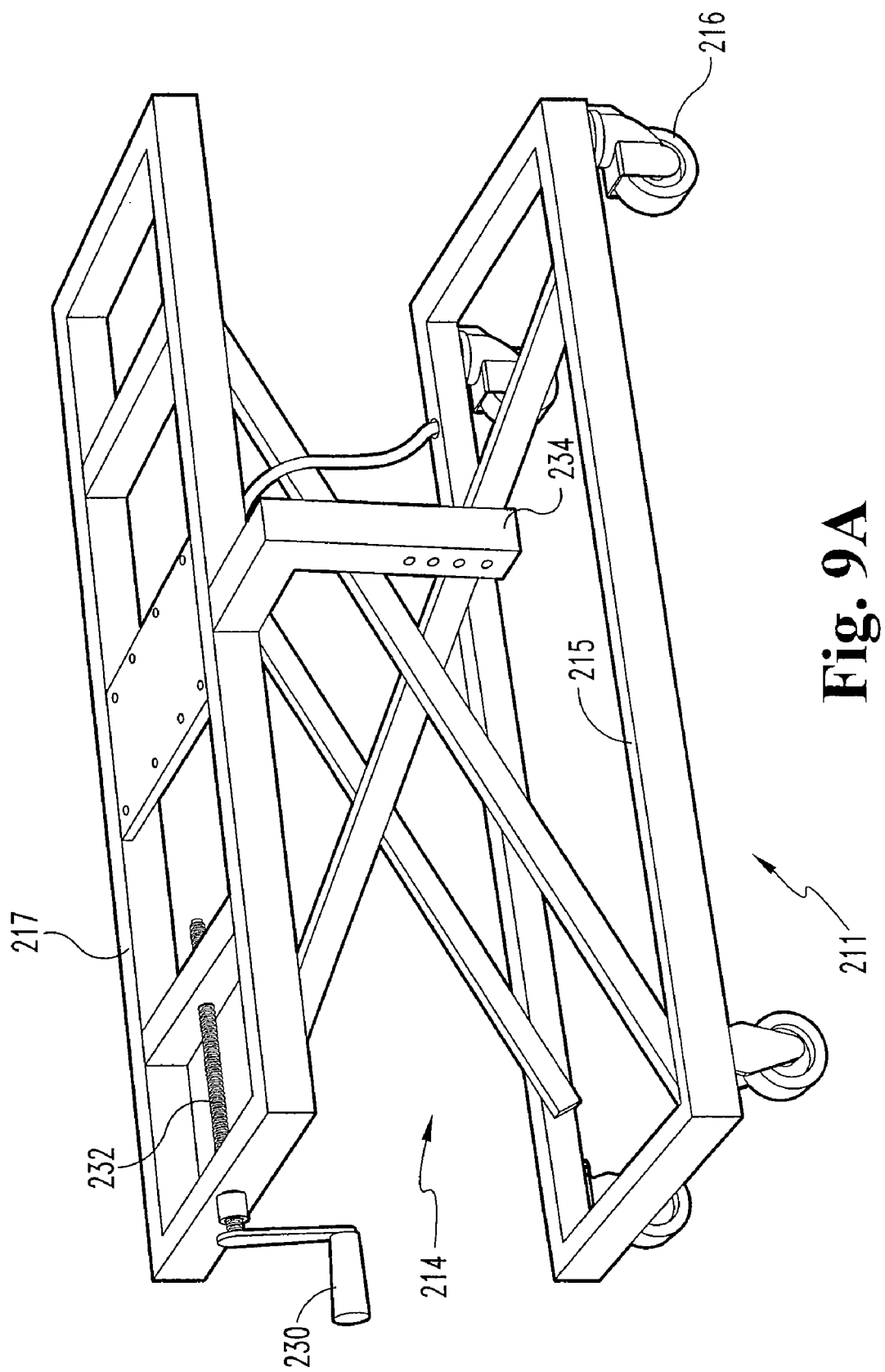
FIG. 9A is a front perspective view of the lifting system of a third embodiment of the present invention utility carrier system.
Figure 9B:
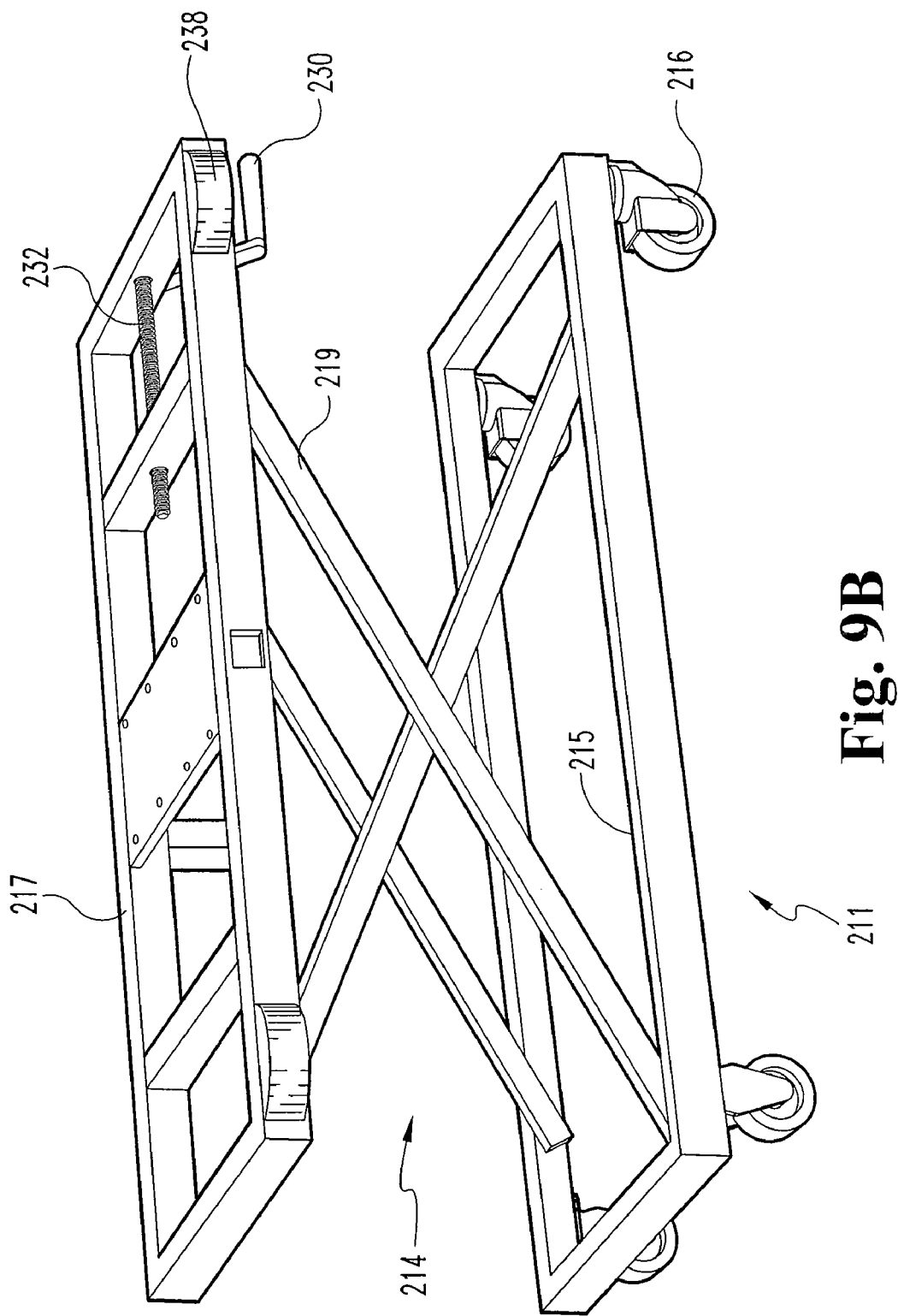
FIG. 9B is a rear perspective view of FIG. 9A.
Figure 9D:
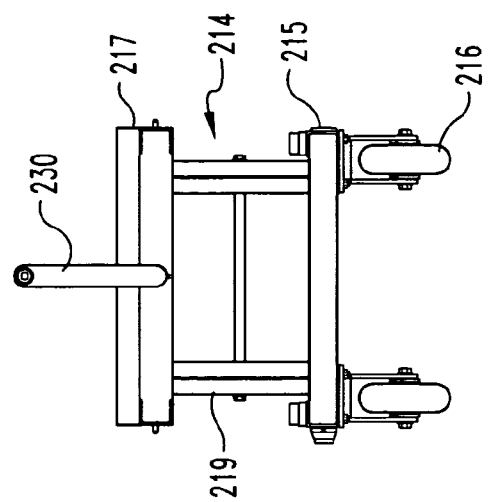
FIG. 9D is a side elevational view of FIG. 9A.
Figure 9C:
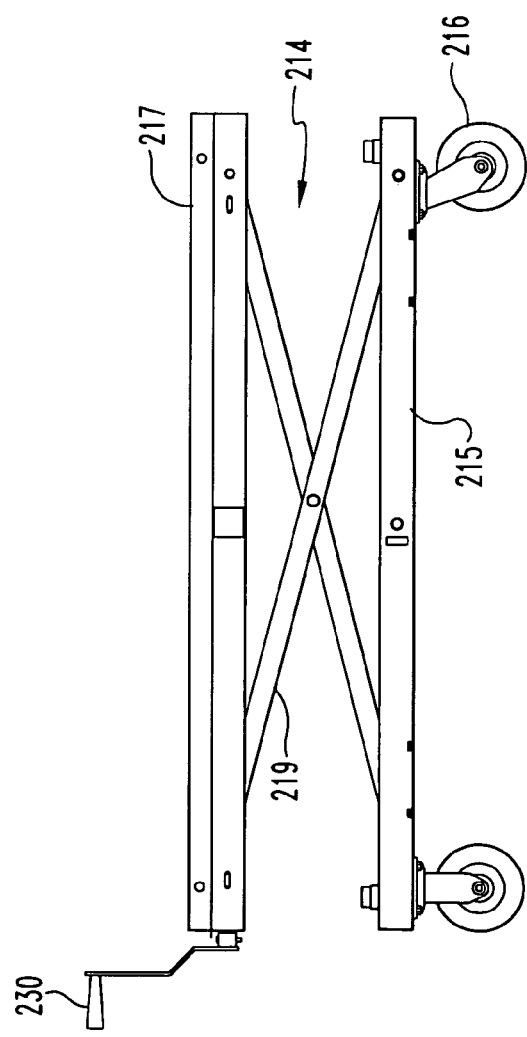
FIG. 9C is a front elevational view of FIG. 9B.

FIGS. 7-8 illustrate a second embodiment of the present invention, a portable grilling apparatus 110 having a recessed housing platform 112 having at least one recess 126 formed therein for accepting a barbeque grill 120. A wheeled base 111 is connected to the portable grilling apparatus 110, and a lift system 114 is interposed between the base 111 and the recessed platform 112 for moving the wheeled base 111 relative to the platform 110 between a transport position and a use position.

The at least one recess 126 is sized to receive a barbeque grill 120, and may therefore have any shape convenient to accepting a particular barbeque grill, such as rounded or semispherical, or a rectangular parallelepiped.

The wheeled base 111 is preferably a rectangular frame 115 from which wheels 116 downwardly extend. The wheels 116 are preferably caster or pneumatic type, but may alternately be of any type convenient to transporting the portable grill 110 over short distances on relatively flat terrain.

The lift system 114 extends between the wheeled base 111 and the housing 112, and connects to each. In this embodiment, the lift system 111 includes a scissors-type lifting apparatus similar to that of the first embodiment above that may be cranked to alternately extend or diminish the distance between the housing 112 and the base 111. In other contemplated embodiments, the lift system may be of any convenient mechanical or electromechanical type, such as a worm drive, a pneumatic or hydraulic lifting assembly, an electric motor drive assembly, or the like.

The portable grilling apparatus 110 is attachable/detachable to a transport vehicle by using the scissors lift system 114. The scissors lift system 114 is raised until the square hitch tube 34 is above the height of the rollered receiver hitch 36 when mounted and pinned 37 and locked 39 to a transport vehicle (see FIGS. 5A-B). The apparatus 110 is then rolled on wheels 116 into place such that the square hitch tube 34 is over the rollered receiver hitch 36, and then the scissors lift system is lowered into the transport position with the square hitch tube 34 received within rollered receiver hitch 36. Rollers 40, 42 at the top of rollered receiver hitch 36 ease the insertion of square hitch tube 34 of the scissors lift system and prevents the pieces from binding when the apparatus 10 and a transport vehicle are on unleveled ground, for example. When the scissors lift system 114 is fully lowered into the transport position and the square hitch tube 34 has been pinned and locked in place within rollered receiver hitch 36 with conventional hitch pin 44 and lock 45, and the taillights 38 have been electrically connected to a transport vehicle's electrical system, the apparatus 110 is transportable by a transport vehicle. During transport, the wheels 116 do not touch the ground. Reversing theses steps would place the apparatus 110 in the use position, ready for a tailgating party.

FIGS. 9A-9D illustrate another embodiment of the lifting assembly 214 in greater detail. Lifting assembly 214 includes a lower frame or base 215 connected to an upper frame 217 by a lift actuator 219. Wheels or rollers 216 extend from the lower frame 215. The lift actuator 219 is operationally connected to a power source 230 that may either be manually or remotely actuated. In the preferred embodiment, the lift actuator 219 is a scissors lift and the power source 230 is a hand crank that turns a threaded rod 232 connected to the scissors lift 219, such that turning the hand crank 230 in a first direction expands the scissors lift 214 to separate the frames 215, 217 (i.e., to define a 'freestanding position') and turning the hand crank in a second, opposite direction brings the frames 215, 217 closer together (i.e., to define a 'transport position'). In other embodiments, the lift actuator 219 may be of any convenient type, such as a screw drive, a hydraulic or pneumatic ram, or the like and the power source may be of any convenient type such as an electric motor, an internal combustion engine, or the like. In some embodiments, the lift assembly 214 is integrally connected to a housing platform, such as by semi-permanent fasteners, welds, or the like; in other embodiments the lifting assembly 214 is removably connected to a housing platform such as by quick release fasteners, buckles and straps, or the like such that one lifting assembly may be used with a plurality of readily exchanged housing platforms.

FIGS. 10A-15 illustrate still another embodiment of the present invention, a transportable utility carrier system 210 having a recessed housing platform 212 having an interior transport volume 226 formed therein for accepting various cargo. A wheeled base 211 is connected to the utility carrier system 210, and a lift system 214 is interposed between the base 211 and the platform 212 for moving the wheeled base 211 relative to the platform 212 between a transport position and a freestanding or deployed "in use" position.

The interior transport volume 226 is sized to various cargo, and may be subdivided into subvolumes of various sizes and shapes.

The wheeled base 211 is preferably a rectangular frame 215 from which wheels 216 downwardly extend. The wheels 216 are preferably caster or pneumatic type, but may alternately be of any type convenient to transporting the utility carrier system 210 over short distances on relatively flat terrain.

The lift system 214 extends between the wheeled base 211 and the housing 212, and connects to each. As discussed above regarding FIGS. 9A-D, in one preferred embodiment the lift system 214 includes a scissors-type lifting apparatus that may be cranked to alternately extend or diminish the distance between the housing 212 and the base 211. In other contemplated embodiments, the lift system 214 may be of any convenient mechanical or electromechanical type, such as a worm drive, a pneumatic or hydraulic lifting assembly, an electric motor drive assembly, or the like.

The utility carrier system 210 is attachable/detachable to a transport vehicle in the same manner as described above in reference to FIGS. 7 and 8, namely the lift assembly 214 is extended until the square hitch tube 234 is above the height of the rollered receiver hitch 236 as attached to a transport vehicle (see FIGS. 5A-B). The apparatus 210 is then rolled on wheels 216 into place such that the square hitch tube 234 is over the rollered receiver hitch 236, and then the lift assembly is actuated to place the utility carrier system 210 into the transport position with the square hitch tube 234 received within rollered receiver hitch 236. Rollers 40, 42 at the top of rollered receiver hitch 236 ease the insertion of square hitch tube 234 of the scissors lift system and prevents the pieces from binding when the apparatus 210 and a transport vehicle are on unleveled ground, for example. When the lift system 214 is fully lowered into the transport position and the square hitch tube 234 has been pinned and locked in place within rollered receiver hitch 236 (such as with conventional hitch pin 44 and lock 45 as in FIGS. 5A-B), and the taillights 238 have been electrically connected to a transport vehicle's electrical system, the apparatus 210 is transportable by a transport vehicle. During transport, the wheels 216 do not touch the ground. Reversing theses steps would place the apparatus 210 in the freestanding position.

Figure 10B:
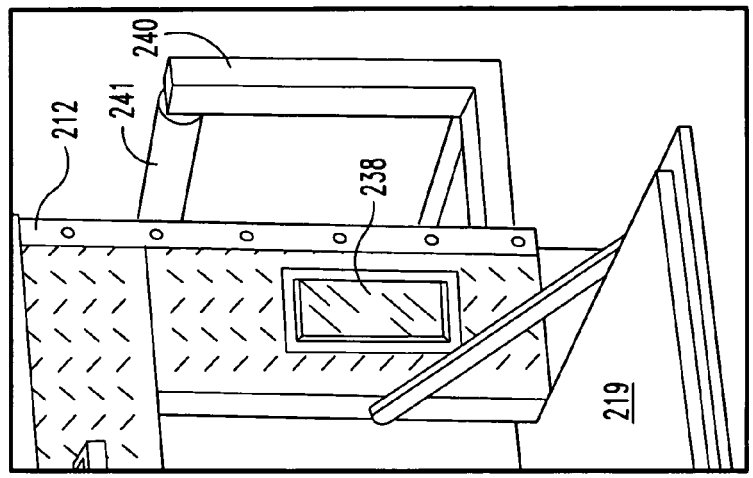
FIG. 10B is an enlarged partial perspective view of FIG. 10A.
Figure 10A:
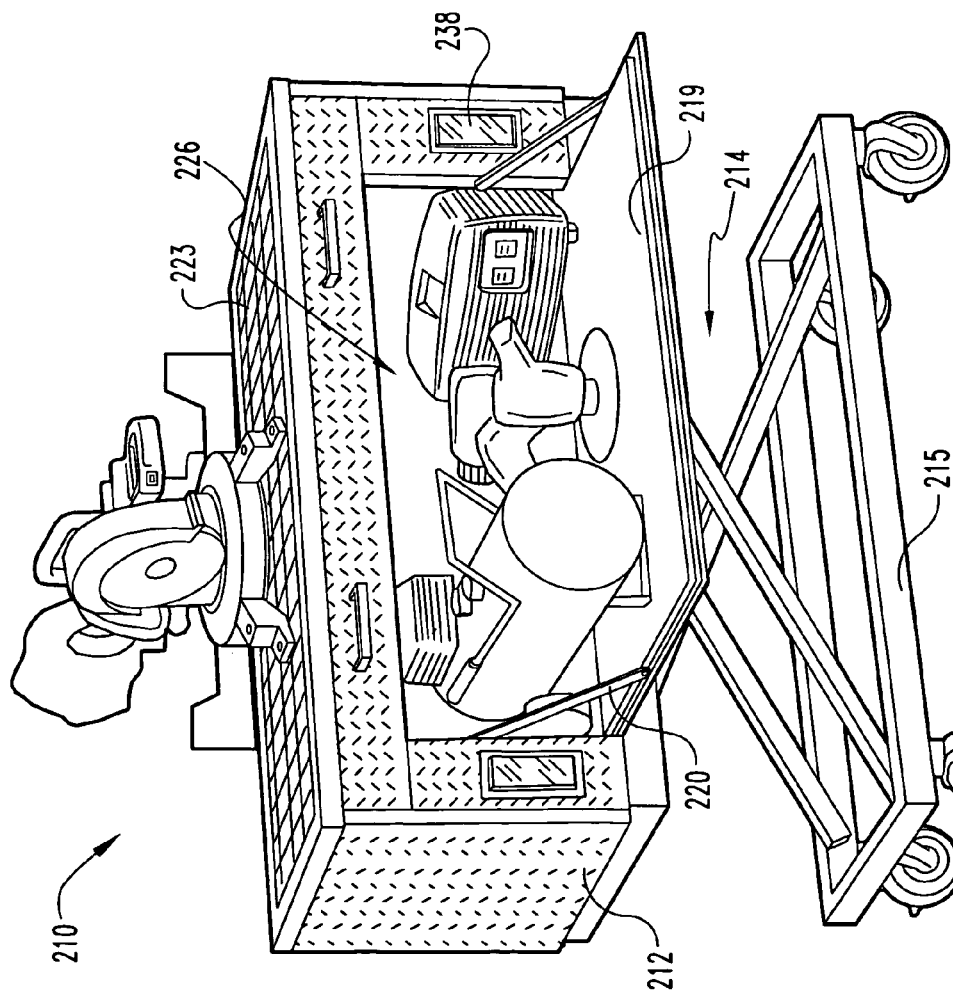
FIG. 10A is a front perspective view of the embodiment of FIG. 9A having a utility power tool carrier platform connected thereto.

Referring to FIGS. 10A-B, one form of the invention includes a utility carrier system 210 especially adapted to transport tools, such as power tools, moderately heavy construction equipment, and the like. In this form, the platform 212 preferably includes a central interior transport space 226 comprising substantially the entire interior volume of the platform 212. The platform 212 also preferably includes a substantially flat top surface 223 made of a sturdy work-surface material such that the platform 212 doubles as a workbench. The platform 212 also preferably includes a plurality of built-in recesses, such as channels or apertures, for receiving various common tools. Also preferably, the platform 212 includes a front panel 219 adapted to pivot between a substantially vertical closed position in which it may be fastened to prevent entry into the interior transport volume 226 and a substantially horizontal open position in which the panel 219 may double as a secondary work surface capable of supporting an array of tools. More preferably, a pair of support members 220 extend between the panel and the platform 212 to provide support when the panel 219 is in the horizontal position.

In one alternate embodiment, the platform 212 is smaller than the top frame 217 and additional support members 240 extend upwardly (i.e., in a direction opposite the bottom frame 215) to bracket the platform 212, providing additional support and stability during transport. Preferably, the support members 240 terminate in a rounded roller or crossbar 241 that more preferably is free to rotate about its major axis. The support members 240 are preferably of variable length, such that the positioning of the roller 241 may be varied. The roller 240 may thus be positioned to provide additional support for lengthy workpieces. The platform 212 also preferably includes taillights 238 operationally connected to the side opposite the square hitch tube (not shown in FIGS. 10A-B).

Figure 11:
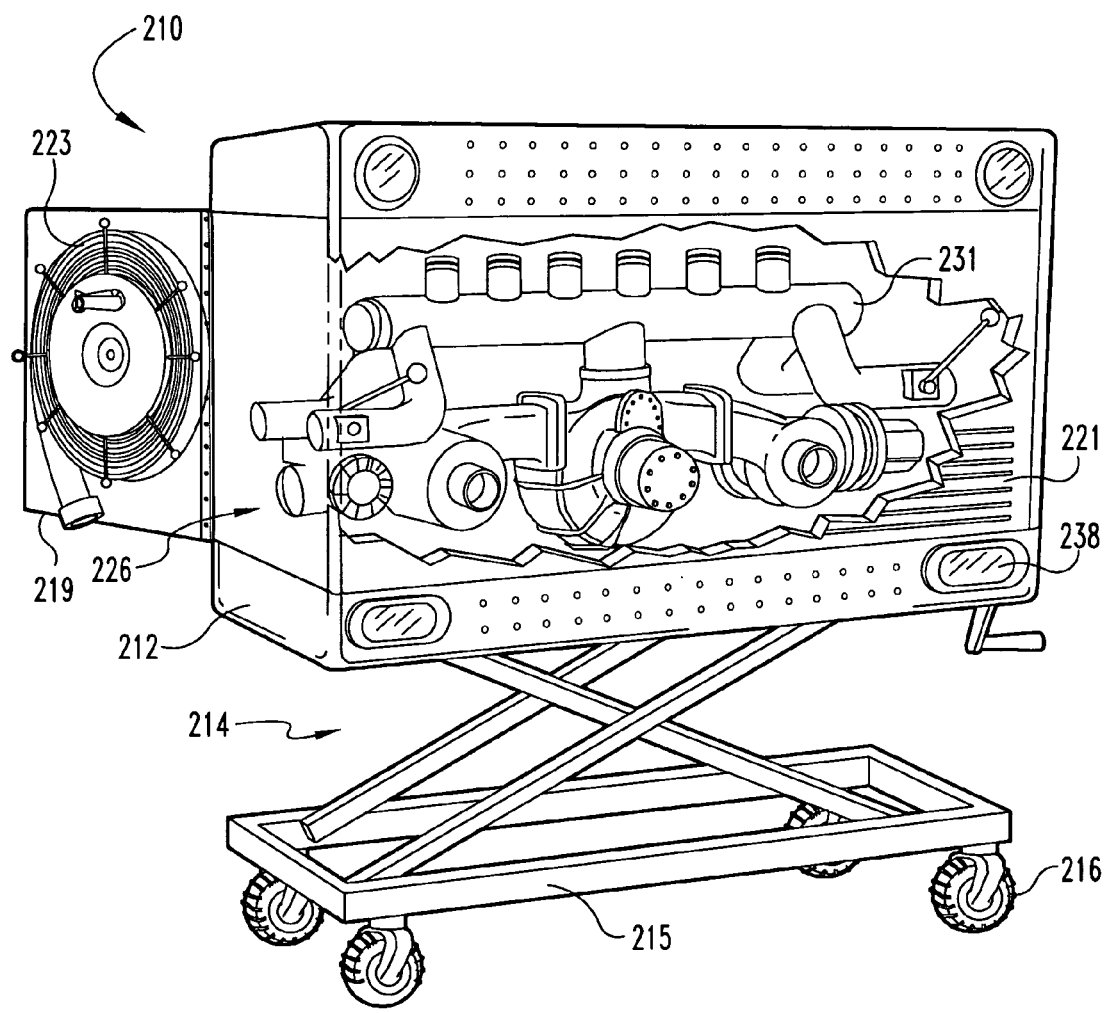
FIG. 11 is a front perspective view of the embodiment of FIG. 9A having a fire fighting tool carrier platform connected thereto.

Referring to FIG. 11, another form of the present invention includes a utility carrier system 210 especially adapted to transport firefighting equipment, such as a self-powered water pump and fire hose combination and the like. In this form, the platform 212 preferably includes a central interior transport space 226 comprising substantially the entire interior volume of the platform 212. The platform 212 also preferably includes a side panel 219 adapted to pivot between a first closed position in which it may be fastened to prevent entry into the interior transport volume 226 and a second open position in which the panel 219; the panel 219 also preferably includes a windable fire hose assembly 223 mounted to one side, such that the fire hose assembly 223 is inside the interior transport volume 226 when the panel 219 is in the closed position.

Also preferably, the platform 212 includes fire-fighting equipment mounted within, such as a water pump 231 affixed within the platform 212. Preferably the water pump is self powered (i.e., includes a battery powered motor, an internal combustion engine, or the like for energizing the pump 231), but may alternately be energized by an external source, such as the engine of a transport vehicle or the like. The pump 231 is preferably adapted to connect to any convenient water source, such as a fire hydrant, pond, lake, or the like.

Figure 12A:
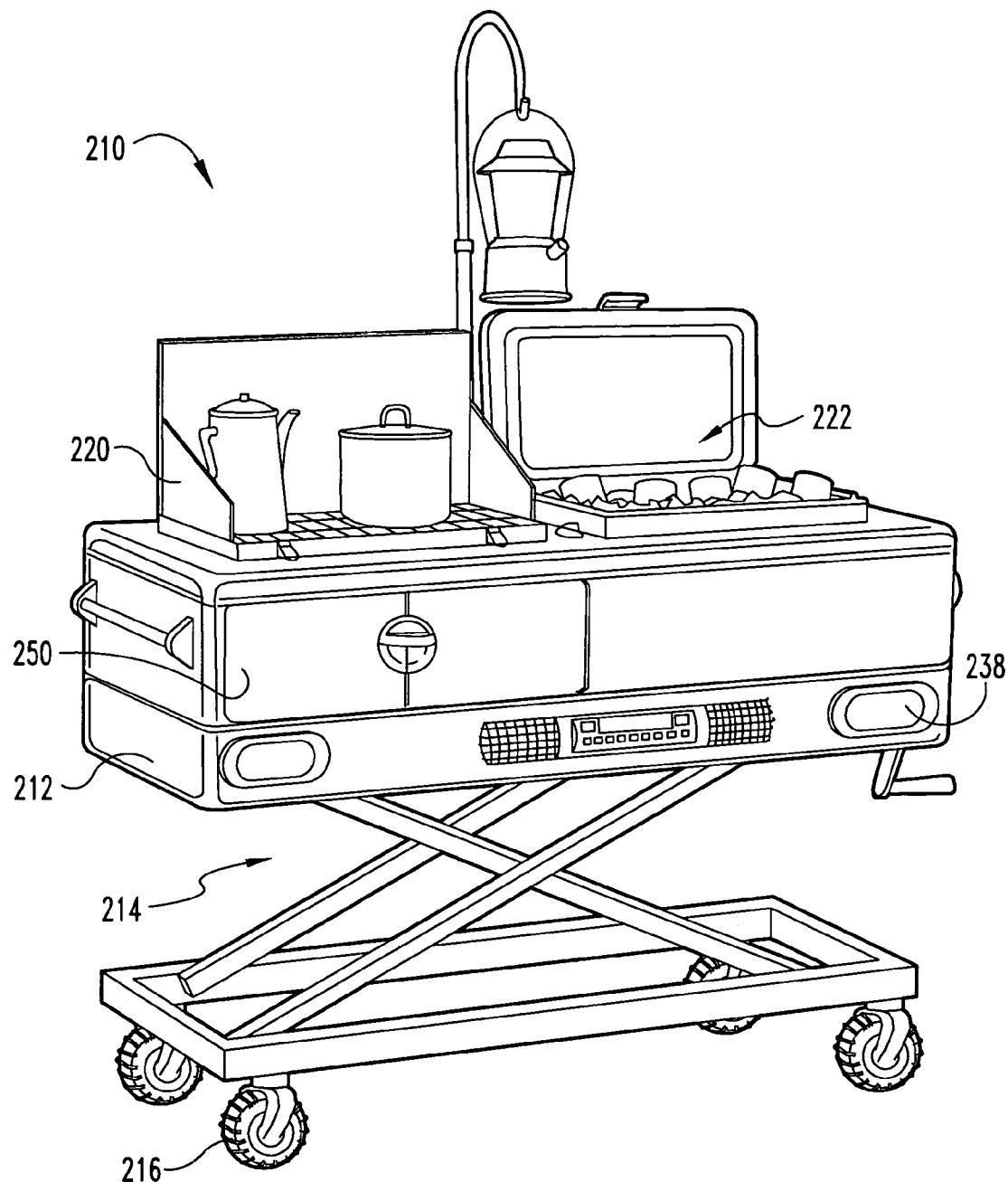
FIG. 12A is a front perspective view of the embodiment of FIG. 9A having a campsite kitchen carrier platform connected thereto.
Figure 12B:
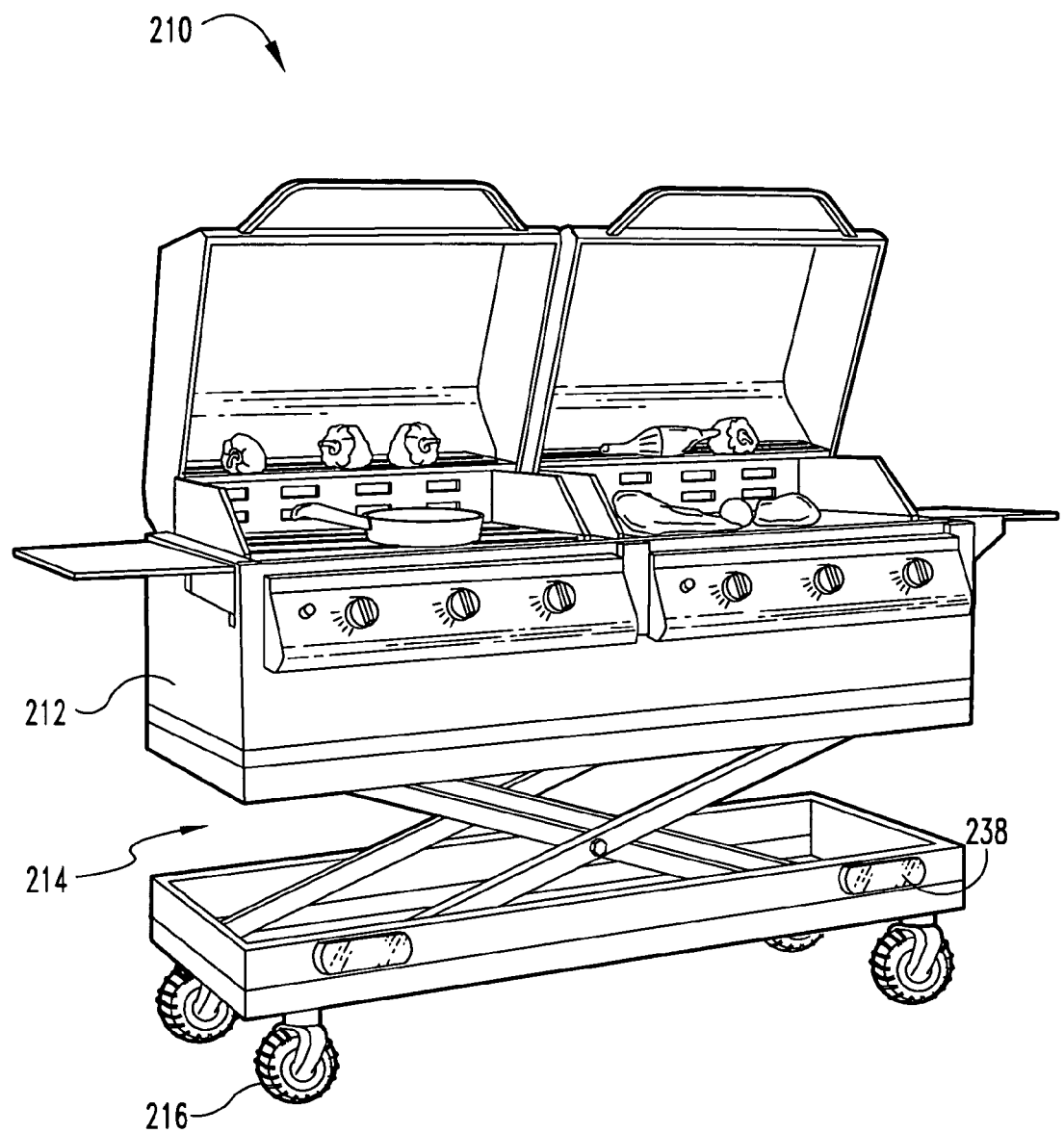
FIG. 12B is a front perspective view of the embodiment of FIG. 9A having a dual grill catering carrier platform connected thereto.

FIGS. 12A-B relate to still another form of the present invention wherein the platform 212 is especially adapted to function as a stand-alone campsite kitchen. The platform preferably 212 includes a stove 220 and refrigerator/cooler 222 (see FIG. 12A.) Alternately, the platform 212 may include two (or more) cooking/grilling surfaces 220 (see FIG. 12B.) More preferably, the platform 212 includes built-in cabinet space 250 and accessories such as a built-in sound system. Optionally, the platform 212 may include a built-in gas oven.

Figure 13:
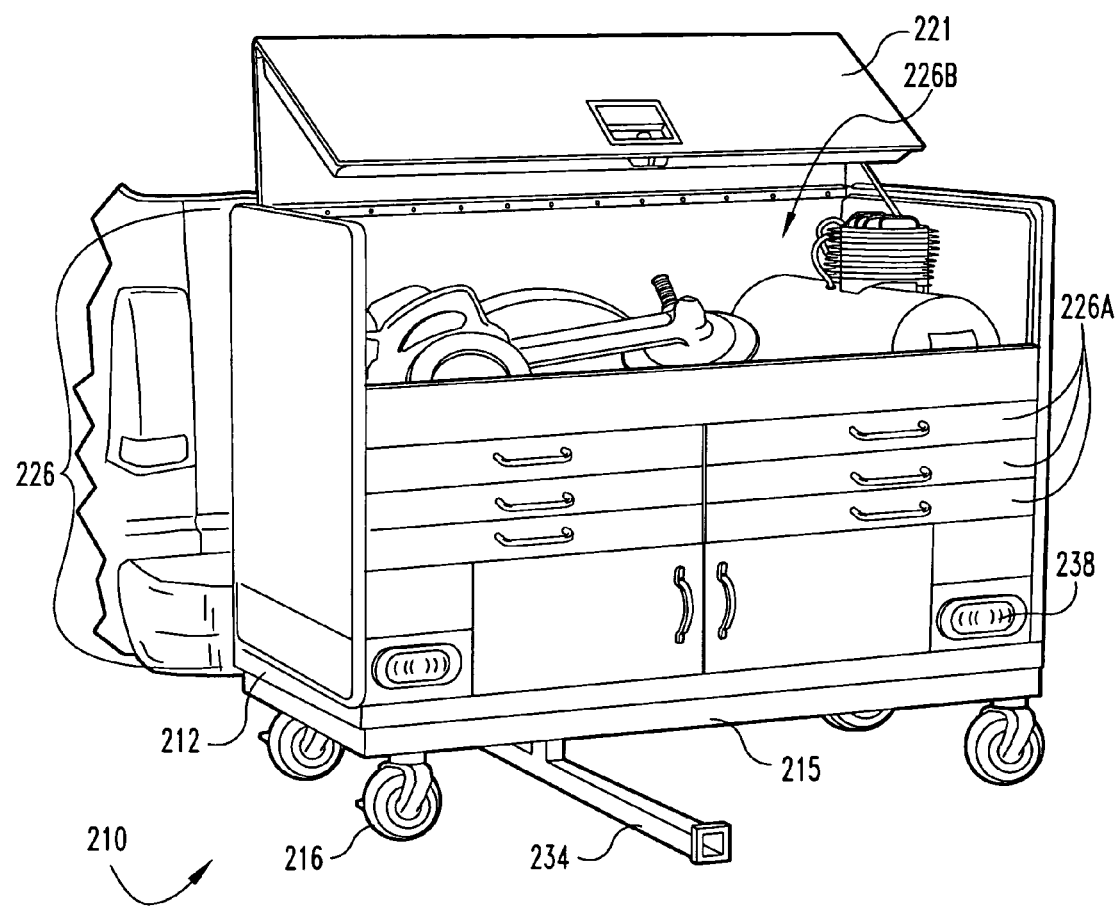
FIG. 13 is a front perspective view of the embodiment of FIG. 9A having a utility tool carrier platform connected thereto.

FIG. 13 relates to still another form of the present invention wherein the platform 212 is especially adapted to function as a stand-alone tool chest. While similar to the embodiment disclosed as FIGS. 10A-B and discussed above, in this form, the platform 212 preferably includes a sectioned central interior transport space 226 defining a plurality of shelves and/or cabinets 226A in addition to an upper larger storage space 226B to accommodate bigger tools. The platform 212 preferably includes a hinged or otherwise movably connected door or panel 221 for allowing access to the larger storage space. In other words, the panel 221 is preferably pivotable between a first position closing access to the interior transport volume 226 and a second position allowing access to the interior volume 226. More preferably, a plurality of drawers 226A are operationally connected to the platform, such that each drawer 226A is slideable between a first portion substantially within the interior transport volume 226 and a second position substantially without the transport volume 226. Likewise, a number of discrete cabinets 226A may be defined within the interior volume 226, each having a cabinet door 221A positionable to prevent access to its respective cabinet 226A.

Figure 14A:
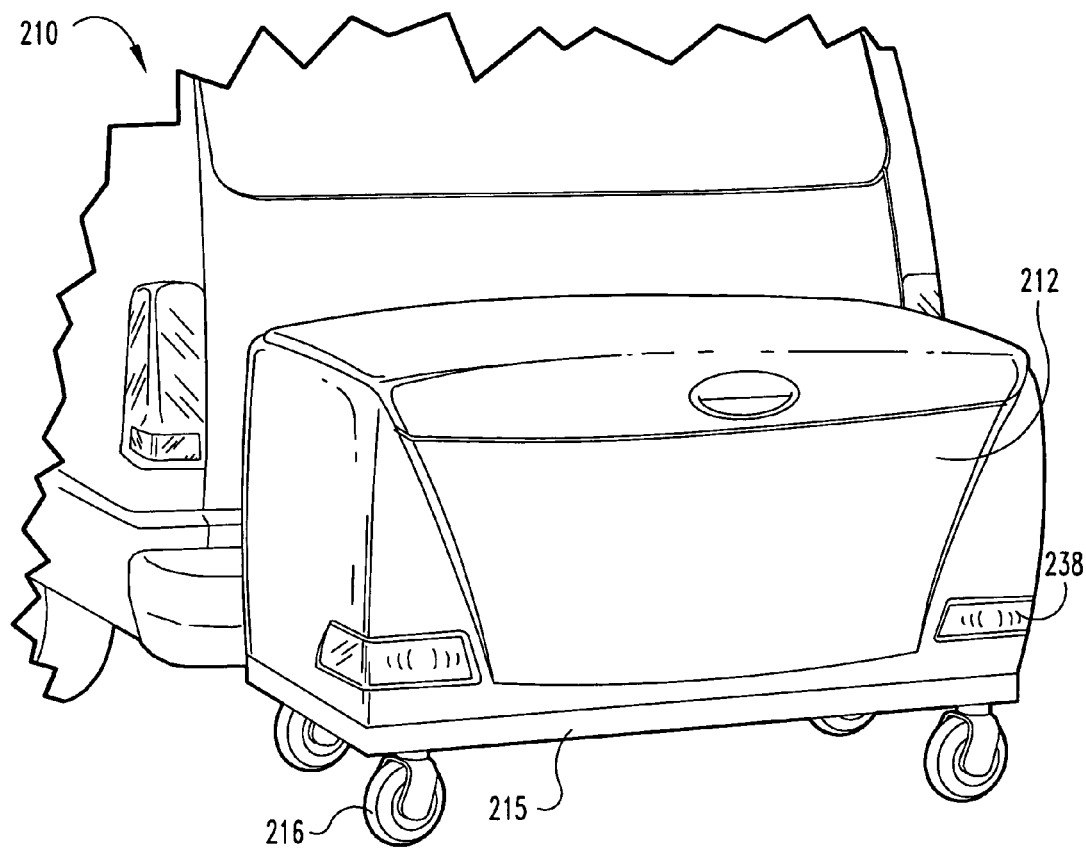
FIG. 14A is a front perspective view of the embodiment of FIG. 9A having a domestic equipment carrier platform connected thereto.
Figure 14B:
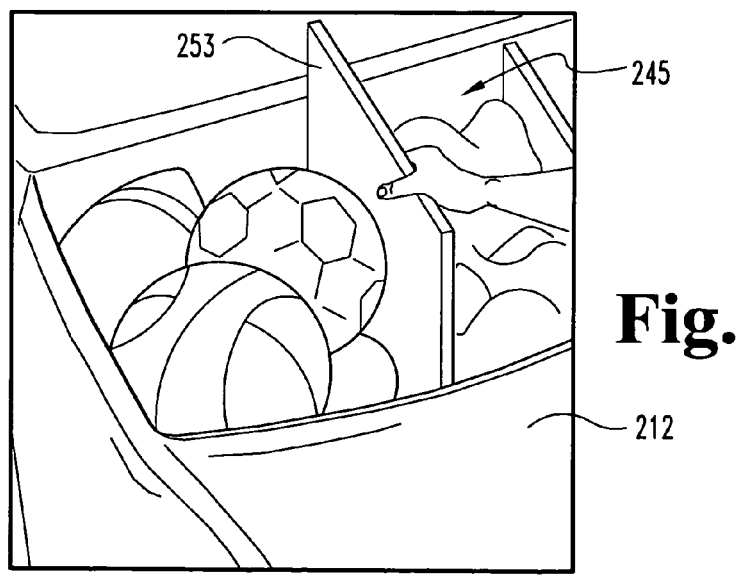
FIG. 14B is an enlarged partial perspective view of FIG. 14A.

FIGS. 14A-B relate to yet another form of the present invention wherein the platform 212 is specifically adapted to function as a domestic equipment carrier, and preferably includes movable sectioning panels 253 for subdividing the interior transport volume 226 into a plurality of smaller subvolumes 245.

Figure 15:
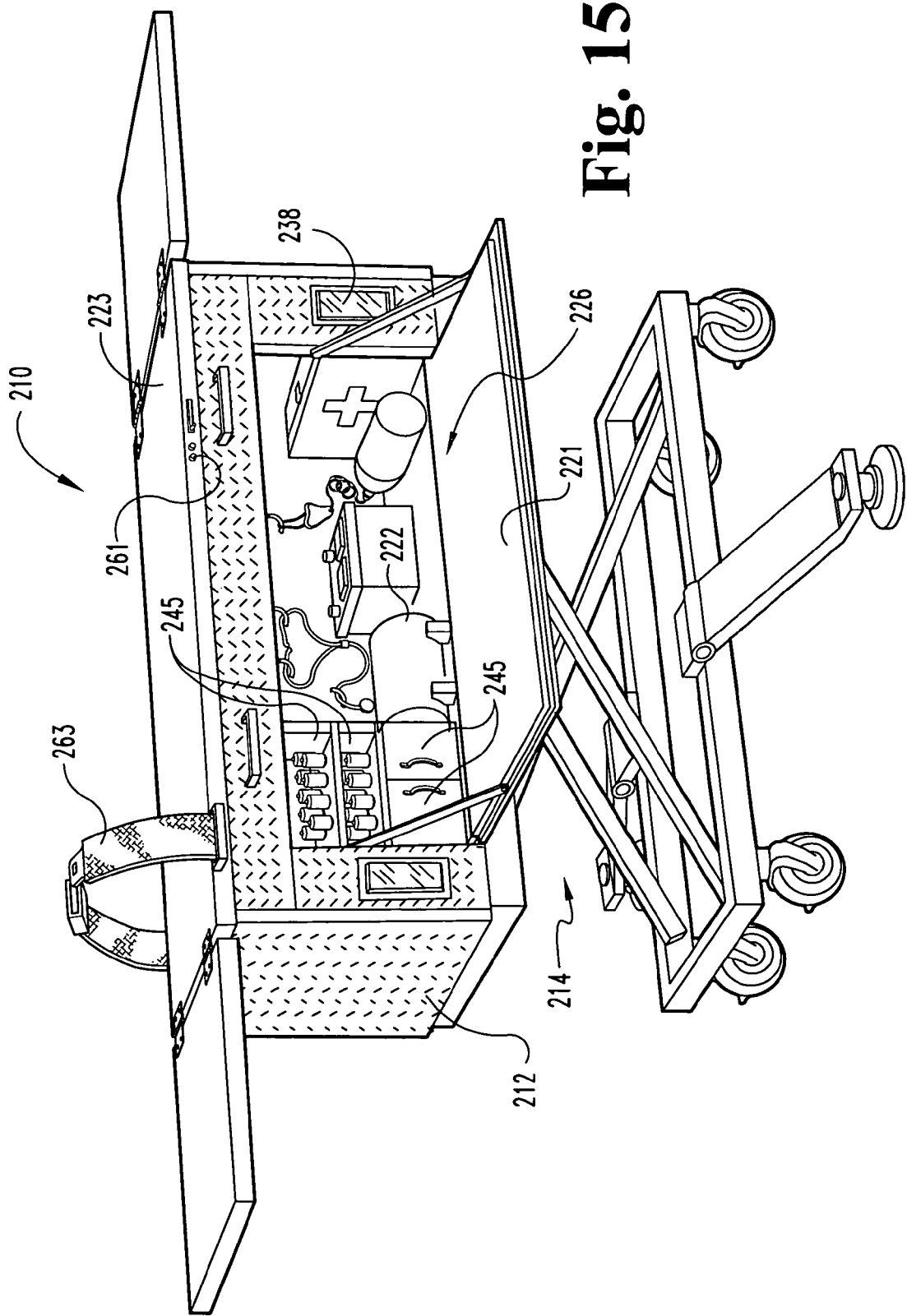
FIG. 15 is a front perspective view of the embodiment of FIG. 9A having an emergency medical equipment carrier platform connected thereto.

FIG. 15 relates to still another form of the present invention wherein the platform 212 is adapted to carry medical supplies, such as into disaster areas. As with the above embodiments, the platform includes at least one panel 221 movable between a first position closing access to the interior transport volume 226 and a second position allowing access to the interior volume 226. More preferably, the interior volume 226 is subdivided into smaller subvolumes 245 in which specific medical items are stored (such as shelves for pharmaceuticals and cabinets for medical equipment; still more preferably, the interior volume 226 and subvolumes 245 are cushioned to prevent damage to the pharmaceuticals and medical equipment during transport.) Preferably, the medical equipment includes diagnostic equipment, surgical tools, lighting equipment, antiseptics and disinfectants, and the like. Also preferably, a cooling device 222 is operationally connected within the platform 212 to refrigerate the interior transport volume 226. More preferably, an electrical power source, such as a generator or battery pack, is mounted within the platform 212 to power that medical equipment that requires an external power source. Still more preferably, an air pump for generating vacuum and/or pressurized air conditions as required for medical and/or dental procedures is mounted within the platform 212.

Preferably, the top surface 223 of the platform 212 is flat and adapted to be used as a medical examination/work surface. More preferably, the platform includes pairs of fasteners 261 connected thereto for attaching deployable straps 263 for securing patients to the top of the platform. Also preferably, the platform 212 includes a hinged or otherwise deployable panel 221 that may be deployed as an additional medical work surface.

In all forms, including those described above as well as those not, the platform 212 is preferably made of a structural material, such as iron, aluminum, graphite composite, sturdy plastic or the like, and is more preferably made of stainless steel. The platform 212 also preferably includes brake lights 238 operationally connected to the 212 platform and connectable to a vehicle's electrical system. Preferably, the brake lights 238 are built into the platform 212, but may alternately be attached to the platform by any convenient fasteners or fastening means.

Figure 16A:
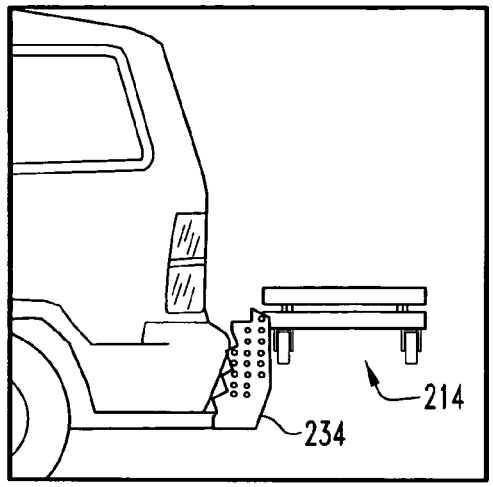
FIG. 16A is a side elevational view of a second form of a hitching assembly used with the embodiment of FIGS. 9A-15.
Figure 16B:
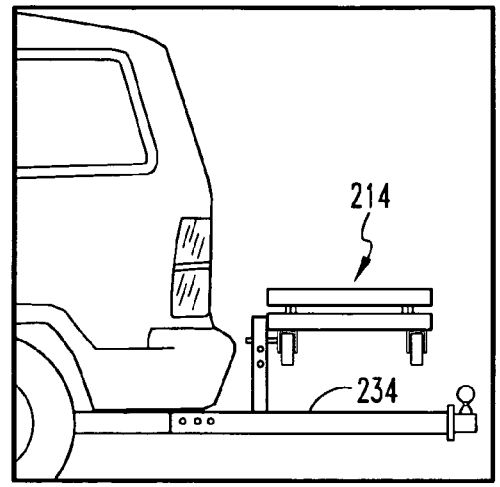
FIG. 16B is a side elevational view of a third form of a hitching assembly used with the embodiment of FIGS. 9A-15.
Figure 16C:
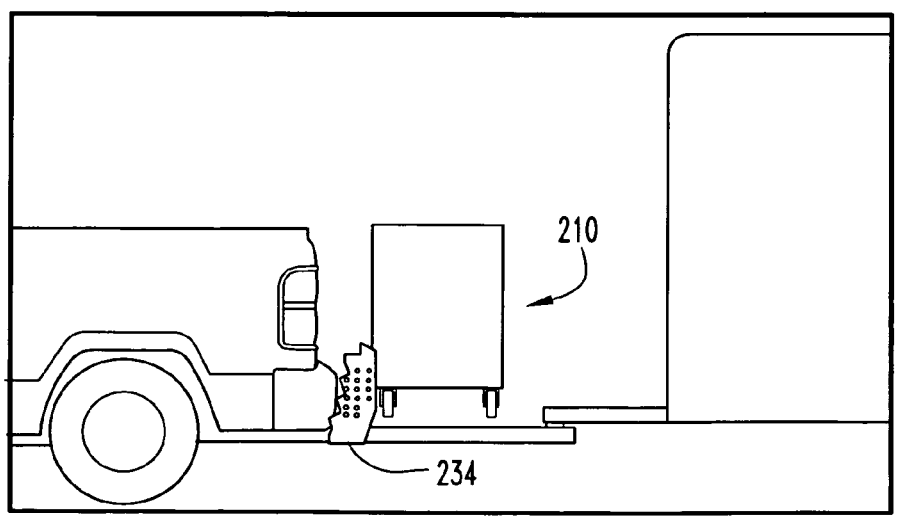
FIG. 16C is a side elevational view of a fourth form of a hitching assembly used with the embodiment of FIGS. 9A-15.

FIGS. 16A-C relate to the hitch system 234 used to connect the utility carrier system 210 to a vehicle. On the side of the utility carrier system 210 opposite the tail lights 238, and preferably connected to the lift system 214, is a (preferably 2 inch by 2 inch square) hitch tube 234. The hitch tube 234 extends from the lift system 214 and is insertable into a rollered receiver hitch 236 that is removably insertable into a conventional hitch fitting on a transport vehicle. The hitch 236 is connected and locked in place for secure transport.

The utility carrier system 210 is removably attachable to a transport vehicle by using the lift system 214. The lift system 214 is raised (i.e., actuated to increase the distance between the lower and upper frames 215, 217) until hitch tube 234 is above the height of the rollered receiver hitch 236 when locked to a transport vehicle (preferably, the locking process is identical as described above in reference to FIGS. 5A-B). The apparatus 210 is then rolled on wheels 216 into position such that the square hitch tube 234 is poised over the rollered receiver hitch 236, and then the lift system 214 is lowered into the transport position (similar to that described and shown above in FIGS. 1, 2 and 5 and the related discussion) with the square hitch tube 234 received within rollered receiver hitch 236. Rollers 240, 242 at the top of rollered receiver hitch 236 ease the insertion of hitch tube 234 of the lift system 214 and prevent the pieces from binding when the apparatus 210 and a transport vehicle are on, for example, uneven terrain. When the lift system 214 is fully lowered into the transport position and the hitch tube 234 has been locked into place within rollered receiver hitch 236 and the taillights 238 have been electrically connected to a transport vehicle's electrical system, the apparatus 210 is then ready for transport by a transport vehicle. Again, note that the wheels 216 are not touching the ground when the utility carrier is in transport position. Reversing theses steps would place the apparatus 210 in the freestanding or deployed position, ready for a use.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

We claim:

1. A transportable utility carrier apparatus for coupling to a transport vehicle, comprising:
   an upper frame;
   a recessed platform connected to the upper frame;
   a wheeled base;
   a lift system interposed between the base and the upper frame for moving the wheeled base relative to the platform between a transport position and a freestanding position;
   a square hitch tube connected to the upper frame; and
   a rollered receiver hitch mountable to the transport vehicle;
   wherein the wheels are spaced from the ground in the transport position;
   wherein the square hitch tube is receivable within the rollered receiver hitch; and
   wherein the rollered receiver hitch eases insertion of the square hitch tube thereinto to prevent binding on unleveled ground.

2. The transportable utility carrier apparatus of claim 1 wherein the wheeled base is closer to the upper frame when the apparatus is in the transport position than when the apparatus is in the freestanding position.

3. A transport assembly that may be connected to and carried by a vehicle, comprising:
   an upper platform for supporting an interior transport volume;
   a wheeled base;
   a lift system interposed between the base and the upper platform for moving the wheeled base relative to the upper platform between a transport position and a use position;
   a square male hitch tube connected to the upper platform; and
   a rollered square female receiver hitch mountable on the vehicle;
   wherein the rollered receiver hitch lockingly connects to the square male hitch tube to define a transport position;
   wherein the wheeled base is spaced from the ground in the transport position;
   wherein the square male hitch tube is receivable within the rollered receiver hitch; and
   wherein the rollered receiver hitch eases insertion of the square hitch tube thereinto on unlevel ground.

4. The transport assembly of claim 3 wherein the housing platform defines an interior transport volume.

5. The transport assembly of claim 3 and further comprising a housing connected to the housing platform, wherein the housing defines an interior transport volume.

6. A transport apparatus connectable to a hitch-equipped vehicle, comprising:
   a housing platform;
   a rollable base;
   a lift system of extending between the base and the housing platform for moving the rollable base relative to the housing platform between a first position and a second position;
   a square male hitch tube connected to the housing platform; and
   a rollered square female receiver hitch mountable on the vehicle;
   wherein the rollered receiver hitch lockingly connects to the square male hitch tube to define a first position;
   wherein the rollable base is spaced from the ground in the first position;
   wherein the square male hitch tube is receivable within the rollered receiver hitch; and
   wherein the rollered receiver hitch eases insertion of the square hitch tube thereinto on unlevel ground.

7. The transport apparatus of claim 6 and further comprising a housing connected to the housing platform, wherein the housing defines an interior transport volume.

8. The transport apparatus of claim 6 wherein the housing defines a recessed storage volume.

9. The transport apparatus of claim 6 wherein the rollered base includes a plurality of wheels extending therefrom.

10. The transport apparatus of claim 6 wherein the lift system is a scissors lift.

11. The transport apparatus of claim 10 wherein the scissors lift is expanded in the second position and contracted in the first position.

* * * * *